US005410342A

United States Patent [19]

Lecheheb et al.

[11] Patent Number: 5,410,342

[45] Date of Patent: Apr. 25, 1995

[54] PRINTHEAD FOR CONTINUOUS INK JET PRINTER

[75] Inventors: Ammar Lecheheb, Suffolk; Richard F. Mitchell, Cambridgeshire, both of England

[73] Assignee: Domino Printing Sciences Plc of Bar Hill, Cambridge, England

[21] Appl. No.: 854,637

[22] PCT Filed: Dec. 21, 1990

[86] PCT No.: PCT/GB90/02040

§ 371 Date: Jul. 2, 1992

§ 102(e) Date: Jul. 2, 1992

[87] PCT Pub. No.: WO91/11327

PCT Pub. Date: Aug. 8, 1991

[30] Foreign Application Priority Data

Jan. 24, 1990 [GB] United Kingdom ................. 9001654

[51] Int. Cl.[6] .............................................. G01D 15/18

[52] U.S. Cl. ......................................... 347/77; 347/73

[58] Field of Search ......................... 347/77, 74, 73, 41

[56] References Cited

U.S. PATENT DOCUMENTS 4,194,210 3/1980 Krause .

4,374,387 2/1983 Iyoda et al. ........................... 347/77

4,596,990 6/1986 Hou ....................................... 347/41

4,604,547 8/1986 Saito et al. .......................... 313/413

FOREIGN PATENT DOCUMENTS 0084891 8/1983 European Pat. Off. .

WO8800529 1/1988 WIPO .

OTHER PUBLICATIONS

Patent Abstracts Of Japan, vol. 4, No. 171 (M-44 (653) 26 Nov. 1980, & JP-A-55 123480 (Y.EBI) 22 Sep. 1980 (see the whole document).

*Primary Examiner*—R. L. Moses

*Attorney, Agent, or Firm*—Laff, Whitesel, Conte, & Saret, Ltd.

[57] ABSTRACT

A printhead (1) for a continuous ink jet printer has a single pair of nozzles (3,3'). One or more oscillators for vibrating the ink (3,3') may be used to break up the twin streams (4,4') of droplets issuing from the nozzles. A pair (5) of charging gates is provided for applying, selectively and respectively, a charge to droplets in the two streams (4,4'). A pair of deflector means (7) apply respective electric fields across the streams (4,4') to deflect the droplets individually in accordance with the charge thereon. A gutter (10) or pair of gutters (11,11') receive droplets from the respective streams if they are not charged. The arrangement is such that the two streams of droplets are deflected in opposite directions so as to be printed.

5 Claims, 2 Drawing Sheets

PRINTHEAD FOR CONTINUOUS INK JET PRINTER

The present invention relates to ink jet printers and, more particularly, to the printhead of a so-called continuous ink jet printer.

Printers of this type have a printhead with one or more nozzles connected to a supply of ink, a string of droplets being caused to flow from the nozzle or nozzles by means of an oscillator, usually a piezoelectric transducer. The row of droplets is directed towards a gutter, but selective droplets can be charged as they leave the nozzle and then deflected in an electric field in order to impinge on a substrate, individual droplets being charged appropriately in order to print at the correct position.

In order to print multiple lines of print from a single nozzle, it is known to provide an array of nozzles and associated piezoelectric transducers arranged closely adjacent to one another, but a problem with this type of printer is that the height of the lines of print is limited by the pitch of the nozzles. Such printers also require the nozzles to be carefully matched in terms of size and directional uniformity as well as positioning relative to one another.

It is known to print multiple lines of print from a single nozzle (see for example our EP-B-0206614), but although this technique is capable of providing multiple lines of print at high speed, the number of lines that can be printed is relatively small.

EP-A-0084891 discloses an ink jet printer which has a pair of nozzles which eject ink droplets which are selectively oppositely charged. The ink droplets then pass between a single pair of deflector plates, the arrangement being that the two streams of droplets converge.

There is a need therefore for a printer capable of printing several lines of print without the complexity of an array of nozzles.

According to the invention therefore, there is provided a printhead for a continuous ink jet printer, comprising a single pair of nozzles; one or more oscillators for vibrating the ink to provide twin streams of droplets from the nozzles in use; a pair of charging gates for applying, selectively and respectively, a charge to droplets in the two streams; a pair of deflector means for applying respective electric fields across the streams to deflect the droplets individually in accordance with the charge thereon; and, a gutter or pair of gutters into which droplets from the respective streams may pass if they are not charged, characterised in that the arrangement is such that the two streams of droplets are deflected in opposite directions away from each other so as to be printed.

By providing only two nozzles and by deflecting the two streams in opposite directions, the height of the two lines of print is not restricted by the pitch of the nozzles.

Furthermore, the printhead may be arranged so that the nozzles are substantially aligned in the direction in which the substrate to be printed moves relative to the printhead, whereby continuous columns of droplets can be printed over the full printing width of the printhead so as to allow printing of large characters, bar codes, etc., as well as multiple lines of characters. The known offset between the nozzles can be taken into account by suitable control electronics in order to allow the printed droplets from each nozzle to be aligned to produce single, full height columns of printed dots.

In such an arrangement the charging gates preferably comprise a single assembly providing two charging paths for the respective droplet streams and the deflector means comprises three deflector plates, the central one of which is at a first voltage and the outer ones of which are at a second voltage. The central deflector plate is also preferably of a lazy-Z shape, whereby the two streams of droplets pass on opposite sides of the centre web of the 'Z' in order to be able to be aligned in the direction of movement of the substrate. The gutter assembly may also have a lazy-Z shape when viewed in cross section, one gutter inlet being provided in each flange of the 'Z'.

The nozzles may have respective oscillators, or may be vibrated by a single oscillator, such as a piezoelectric transducer.

A printhead of the invention can be used to print for example up to eight lines of characters, can print across a wider web than with conventional single nozzle printers and can also print two lines of information at the same speed and quality that a single nozzle printhead can print one line.

Furthermore, character height is not limited by nozzle pitch and there is no requirement for position detectors to achieve a full graphics capability, as there is with array type printers. The simplicity of the printhead allows corresponding simplicity in the control and drive electronics, resulting in lower cost.

The electronic control of droplet charging and deflection may be conventional, is well known in the art and will not be further described.

One example of a printhead constructed in accordance with the present invention will now be described with reference to the accompanying drawings in which.

Figure 1:
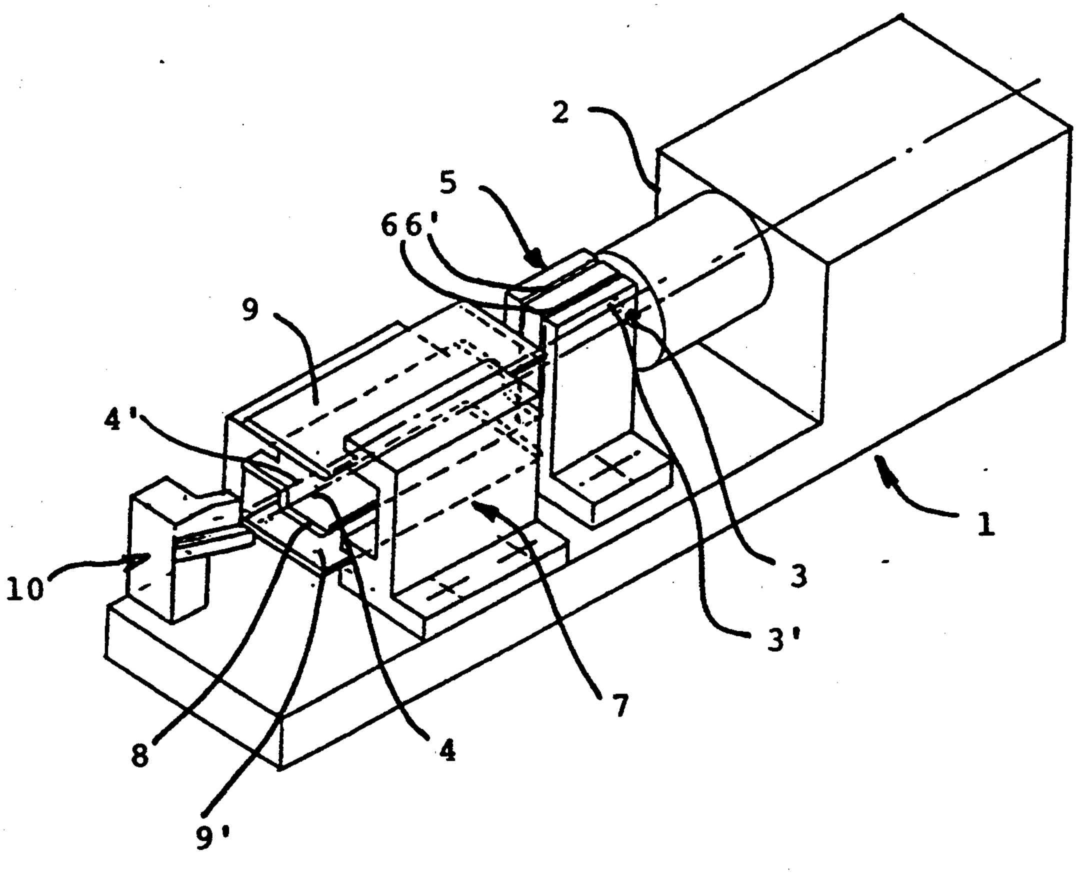
FIG. 1 is an isometric, diagrammatic representation of the printhead.
Figure 2:
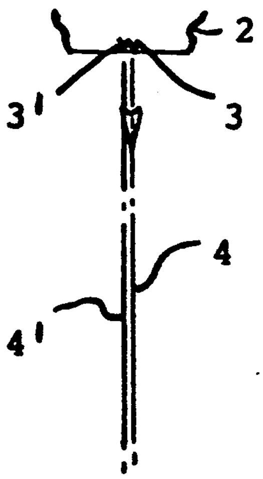
FIG. 2 is a diagrammatic representation of the streams leaving the nozzles; and, FIG. 3 is a diagrammatic representation of the printing process.

The printhead 1 has a gun body 2 with a pair of nozzles 3,3' of conventional type. As shown in FIGS. 1 and 2, from each of the nozzles is directed, in use, a stream 4,4' of droplets. Each stream 4,4' passes through a phase detector and charging assembly 5, which has different apertures 6,6' for each of the streams and whereby individual droplets in each of the streams can be individually and differently charged.

Figure 3:
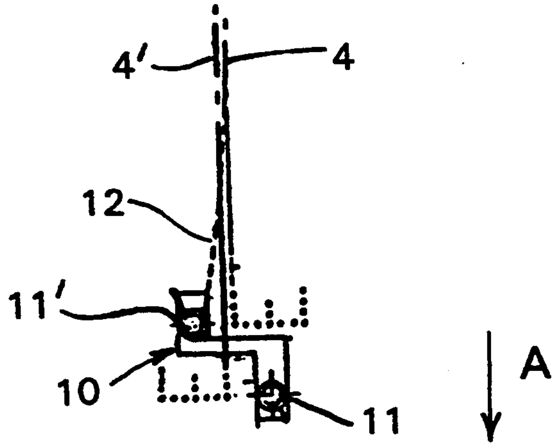

After passing through the charging assembly 5, the two streams 4,4' pass through a deflector plate assembly 7 in the form of three plates 8,9,9', across which an electric field is established in order to deflect the charged droplets. As the two streams are to be deflected in opposite directions, the central plate 8, which, as can be seen, is of a lazy-Z shaped cross-section, is held at a first voltage (which may be ground) and each of the outer plates 9,9' is held at the same different voltage, so that deflection of two similarly charged droplets in the two streams is substantially the same but in opposite directions. Droplets that are not to be printed are passed to a gutter assembly 10 which also has a substantially lazy-Z shaped cross section as most clearly seen from FIG. 3, which is a diagrammatic view of the gutter looking down the streams 4,4', though the streams 4,4' themselves are shown partly from above for clarity. A pair of gutter inlets 11,11' are formed, one in each limb or flange of the 'Z'.

Although the droplets which are not to be printed may be substantially uncharged and therefore undeflected, preferably and as shown, droplets which are not to be printed are deflected 12 into the respective gutter 11 by having a charge of opposite polarity to that normally applied to the printed droplets applied to them in the charging assembly. This enables the nozzles to be substantially aligned in the direction of movement of the substrate (arrow A), preferably very slightly offset by the normal distance between printed droplets on the substrate, so that continuous characters can be printed using droplets from both streams and thus extending in height over the whole printing width of the printhead. The undeflected droplets from the two streams are thus adjacent one another in a full height character as can be seen from the streams and representative characters shown in FIG. 2. This may be particularly useful for printing large barcode symbols.

Whilst the gutter assembly 10 and central deflector plate 8 each have a lazy-Z shape in the example described, other configurations, for example, single parallel plates (i.e. without an intermediate connection) may be used.

We claim:

1. A printhead (1) for a continuous ink jet printer, comprising a single pair of nozzles (3,3'); one or more oscillators for vibrating the ink (3,3') to provide twin streams (4,4') of droplets from the nozzles in use; a pair (5) of charging gates for applying, selectively and respectively, a charge to droplets in the two streams (4,4'); a pair of deflector means (7,8,9,9') for applying respective electric fields across the streams (4,4') to deflect the droplets individually in accordance with the charge thereon; and, a gutter (10) or pair of gutters (11,11') into which droplets from the respective streams may pass if they are not charged; characterised in that:

the arrangement is such that the two streams of droplets are deflected in opposite directions away from each other so as to be printed.

2. A printhead according to claim 1, wherein the charging gates comprise a single assembly (5) providing two charging paths for the respective droplet streams (4,4').

3. A printhead according to claim 2, wherein the deflecting means comprises three deflector plates (8,9,9'), the central one (8) of which is at a first voltage and the outer ones (9,9') of which are at a second voltage.

4. A printhead according to claim 3, wherein the central deflector plate (8) is of lazy-Z shape, the two streams of droplets passing in use on opposite sides of the central web of the 'Z' in order to be able to be aligned in the direction of movement of the substrate.

5. A printhead according to claim 4, wherein the gutter (10) has a lazy-Z shape, one gutter inlet (11,11') being provided in each flange of the 'Z'.

* * * * *